US009096235B2

(12) United States Patent
Kissel

(10) Patent No.: US 9,096,235 B2
(45) Date of Patent: *Aug. 4, 2015

(54) UNIVERSAL MULTIMODAL TRANSPORTATION SYSTEM AND ASSOCIATED INFRASTRUCTURE

(71) Applicant: Waldemar F. Kissel, Gainesville, FL (US)

(72) Inventor: Waldemar F. Kissel, Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/727,732

(22) Filed: Dec. 27, 2012

(65) Prior Publication Data

US 2013/0186297 A1 Jul. 25, 2013

Related U.S. Application Data

(63) Continuation-in-part of application No. 12/827,437, filed on Jun. 30, 2010, now Pat. No. 8,342,101.

(51) Int. Cl.
| | |
|---|---|
| *B61B 5/02* | (2006.01) |
| *B61B 15/00* | (2006.01) |
| *B60F 1/02* | (2006.01) |
| *B61B 13/04* | (2006.01) |
| *E01B 25/08* | (2006.01) |

(52) U.S. Cl.
CPC ... *B61B 5/02* (2013.01); *B60F 1/02* (2013.01); *B61B 13/04* (2013.01); *B61B 15/00* (2013.01); *E01B 25/08* (2013.01); *Y02T 30/30* (2013.01); *Y02T 30/40* (2013.01)

(58) Field of Classification Search
CPC .......... B61B 5/02; B61B 15/00; E01B 25/08; Y02T 30/30; B60F 1/02
USPC ................ 104/119, 124, 243; 105/145, 215.2
See application file for complete search history.

(56) References Cited

U.S. PATENT DOCUMENTS

| | | | |
|---|---|---|---|
| 1,853,572 A | 4/1932 | Nugent | |
| 2,042,265 A | 5/1936 | Main | |
| 2,043,703 A | 6/1936 | Main | |
| 2,135,307 A | 11/1938 | Keator | |
| 2,150,348 A | 3/1939 | Strauss | |
| 2,161,106 A | 6/1939 | Strauss et al. | |
| 2,193,046 A | 3/1940 | Strauss et al. | |
| 2,541,514 A | 2/1951 | Herold | |
| 3,225,704 A | 12/1965 | Gilvar et al. | |
| 3,254,608 A | 6/1966 | Alden | |
| 3,338,184 A | 8/1967 | Fisher | |
| 3,919,947 A * | 11/1975 | Simon et al. | 104/124 |
| 4,313,383 A | 2/1982 | Parazader | |
| 4,489,659 A | 12/1984 | Kamohara et al. | |
| 6,324,994 B1 | 12/2001 | Glenn | |
| 6,450,103 B2 | 9/2002 | Svensson | |
| 6,923,124 B2 | 8/2005 | Roane | |

(Continued)

*Primary Examiner* — Zachary Kuhfuss
(74) *Attorney, Agent, or Firm* — GrayRobinson P.A.; Michael J. Colitz, III

(57) ABSTRACT

Disclosed is a transportation system with integrated infrastructure. In one embodiment, this infrastructure takes the form of a hollow elevated load bearing guideway structure designed to support the weight of traveling vehicles. The structure supports a backbone beam, or rail, that has multiple functions. These functions may include vehicle control, security, and energy delivery. The structure is bimodal meaning vehicles can have wheels like cars or steel rimmed wheels like a train or any combination thereof.

17 Claims, 9 Drawing Sheets

(56) References Cited

U.S. PATENT DOCUMENTS

| | | |
|---|---|---|
| 6,934,603 B1 | 8/2005 | Kochanneck |
| 7,077,065 B2 * | 7/2006 | Tremblay et al. ............ 105/72.2 |
| 7,788,000 B1 | 8/2010 | Davis, Jr. |
| 7,975,618 B2 | 7/2011 | Bullis |
| 8,066,200 B2 | 11/2011 | Hepner et al. |
| 2007/0289477 A1 | 12/2007 | Sobolewski |
| 2009/0050011 A1 | 2/2009 | Li |
| 2011/0226151 A1 | 9/2011 | Pumpelly |

\* cited by examiner

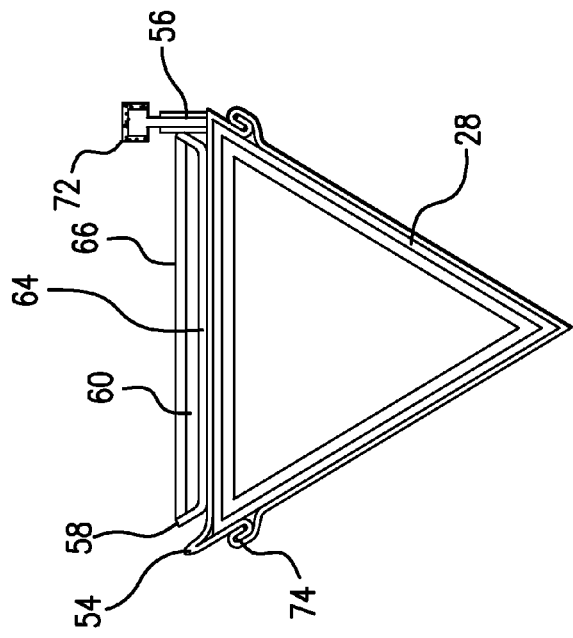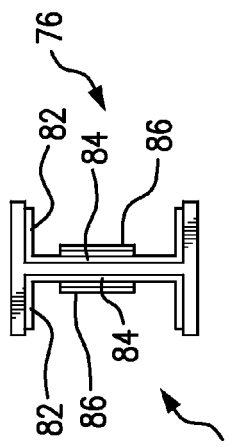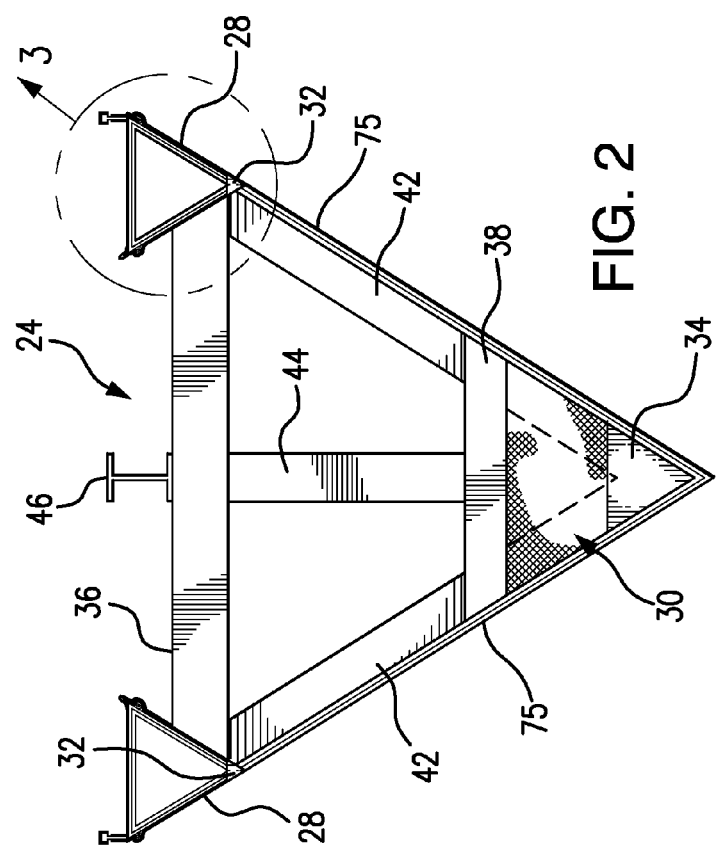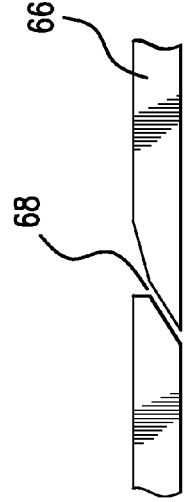

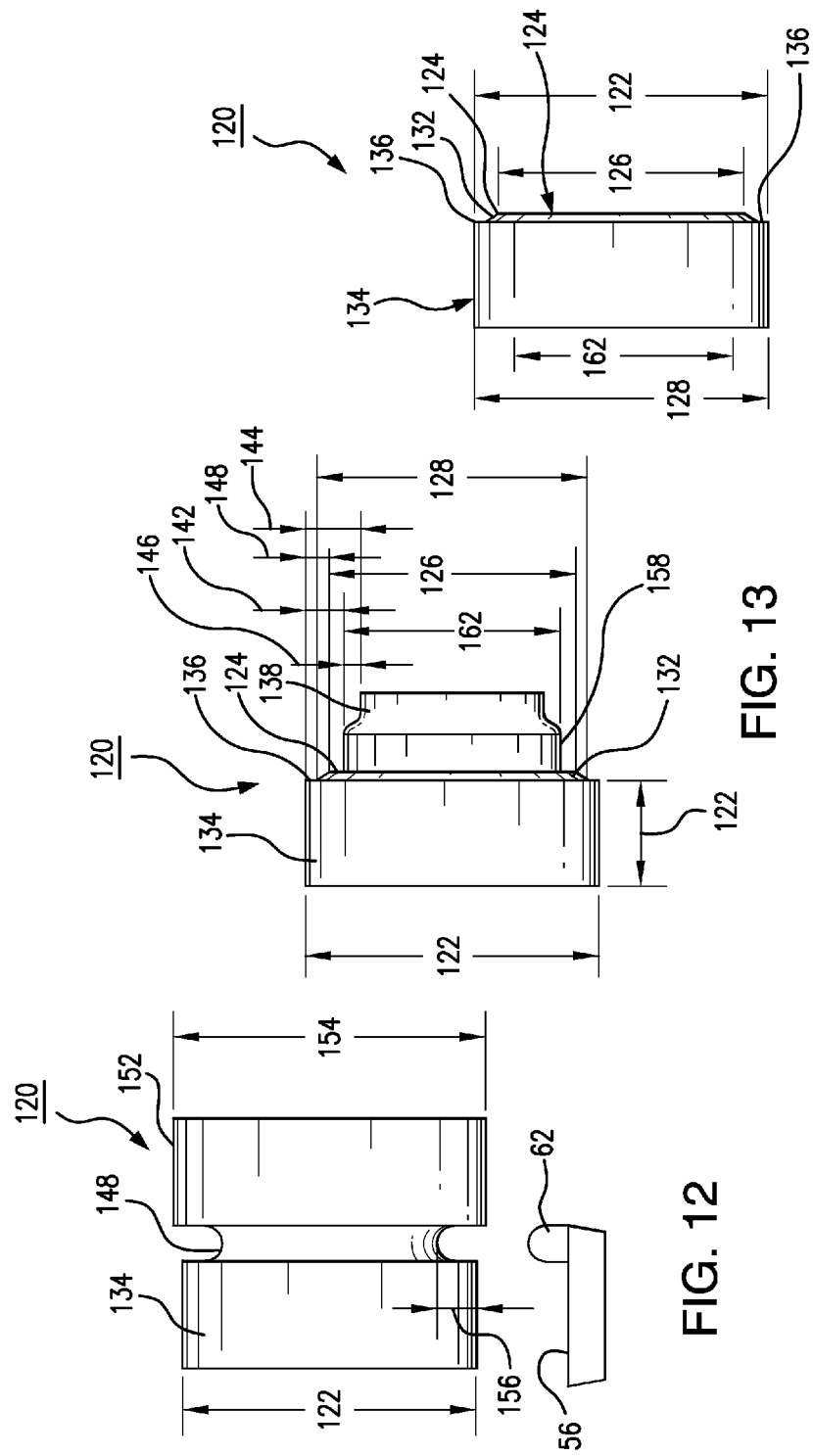

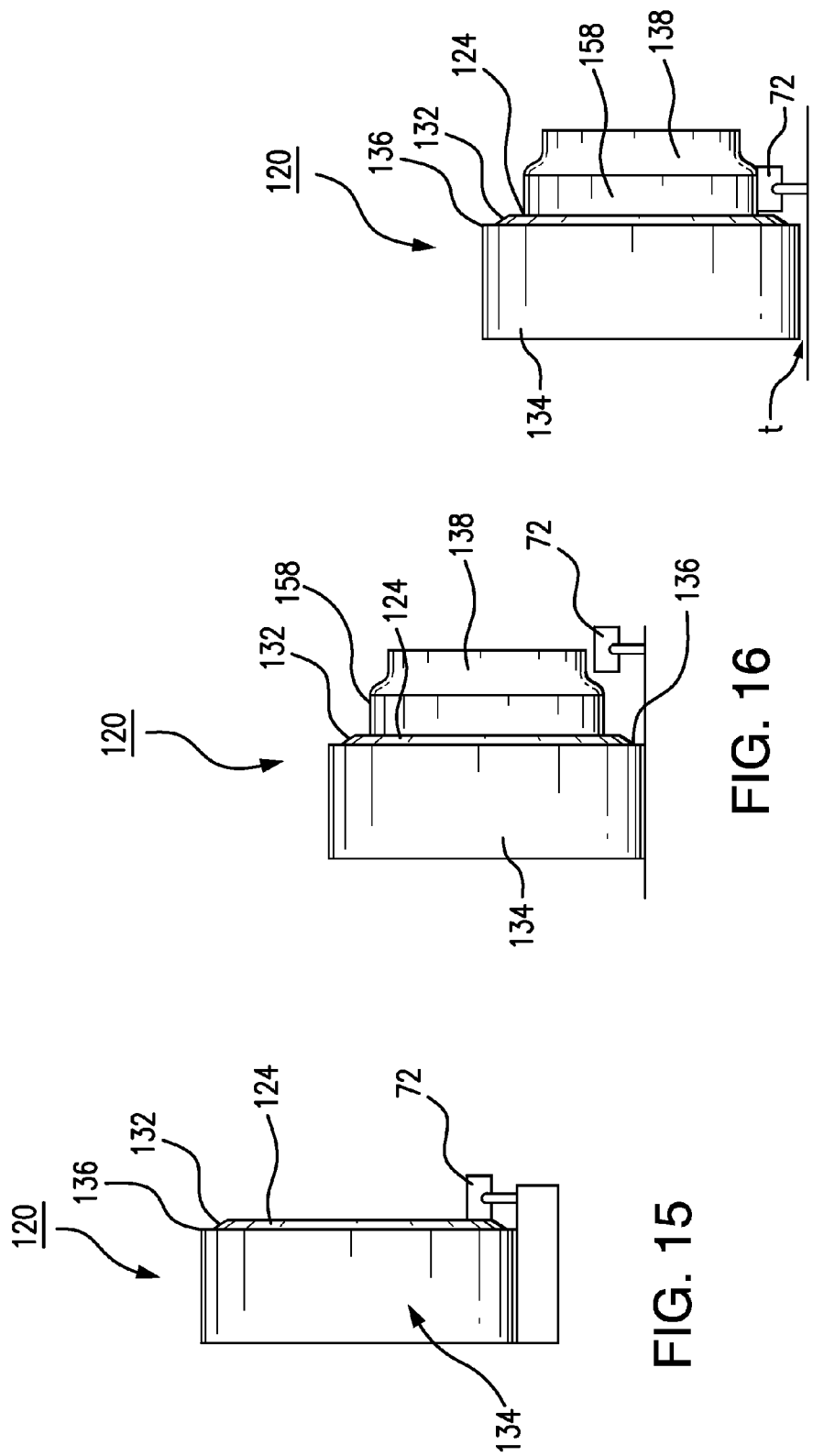

UNIVERSAL MULTIMODAL TRANSPORTATION SYSTEM AND ASSOCIATED INFRASTRUCTURE

CROSS REFERENCE TO RELATED APPLICATIONS

This application claim priority to, and is a continuation-in-part of, co-pending Utility patent application Ser. No. 12/827,437 entitled "Integrated Multimodal Transportation System and Associated Infrastructure," which was filed on Jun. 30, 2010. That application, in turn, claims priority to Provisional Patent Application No. 61/221,669 filed on Jun. 30, 2009 and entitled "Automated Guideway Infrastructure." The contents of both these applications are fully incorporated herein.

BACKGROUND OF THE INVENTION

1. Field of the Invention

The present invention relates to a transportation system. More specifically, the present invention relates to a transportation system with integrated infrastructure and multi-modal transport vehicles.

2. Description of the Background Art

Most everyone is familiar with transportation infrastructure such as the highways, streets, roads and limited access Interstates. Although widely used, such infrastructure has many shortcomings. Vehicles traveling on conventional highways require the continuous attention and skill of the vehicle operator. These skills, however, can vary based on experience, age, health, mental condition, disposition, medication, drug influences, alertness, and distractions. Moreover, anyone lacking the requisite skill and/or attention can suffer dire and fatal consequences. Tens of thousands of individuals lose their lives in vehicle crashes each year.

Conventional highways are also vulnerable to weather conditions such as ice, rain, snow, grease, hydroplaning, silt, mud, strong winds, lightning, fog, and smog visibility, all of which affect both vehicle control and traction. Night conditions, visibility and lightning can add to the difficulty of the driver.

Conventional highways are also required to be much wider than the vehicle because even skilled drivers cannot steer the vehicle along a precise path. Broad shoulders are also required because vehicles occasionally run off the road, need recovery space, and sometimes require emergency parking.

Vehicles traveling upon conventional highways are also prone to accidents that result in the vehicle running off of the highway, hitting stationary objects, rolling over, going into water, or traveling down embankments. Vehicles can likewise be involved in collisions with other vehicles. Furthermore, because highways are typically built on the surface or on grade, both the highway and the vehicles traveling thereon present a hazard to children, pedestrians, pets, wildlife, and bicycles.

Highways are also undesirable because they require a broad finished asphalt or concrete surface even though the wheels of vehicles actually use only a fraction of this surface. This creates a large heat sink and results in undesirable water run off.

Conventional highways are also used as a passage way for a variety of municipal services, such as sewer lines, telephone lines, and power lines. The areas above and below our highways are often crowded. When services go into the ground they become less accessible, harder to find, create interference with one another and are subject to more corrosive forces. When services go overhead they create clutter and the wooden or concrete supporting poles are a hazard.

There is also the disadvantage that with all the problems of vehicle control, potential mechanical failures, highway conditions and the limitations of human operators the vehicles cannot safely travel at speeds up to the aerodynamic and physical potential of the vehicle.

It is an objective of the present invention to overcome these deficiencies by providing a transportation system with an integrated infrastructure and by further providing multimodal vehicles.

SUMMARY OF THE INVENTION

One of the advantages of the present system is achieved by providing a transportation system with an integrated infrastructure.

Yet another advantage is realized by providing a transportation system with multimodal vehicles.

Still yet a further advantage is realized by creating a rail structure wherein the contact surface for wheeled vehicles is minimized.

Another advantage results in a transportation structure that permits vehicles to travel on a contact surface or on rails.

The system also realizes advantages by providing a guideway structure that can carry associated municipal utilities equipment such as power lines, telephone lines, fibre, coaxial cable, water and/or sewer lines.

These and other advantages are accomplished by providing a transportation system with integrated infrastructure. In one embodiment, this infrastructure takes the form of a hollow elevated load bearing guideway structure designed to support the weight of traveling vehicles. The structure supports a backbone beam, or rail, that has multiple functions. These functions may include vehicle control, security, and energy delivery. The structure is bimodal meaning vehicles can have wheels like cars or steel rimmed wheels like a train or any combination thereof. The hollow guideway structure can contain a variety of utilities. The guideway structure can be supported on a hollow tower that includes a conduit and an access corridor for all associated utilities. The system also includes vehicles with bimodal wheels which enable the vehicle to travel on rails on the guideway or on a contact surface on the guideway. Additionally, the vehicle can travel on conventional roads. The bimodal wheels are such that the vehicles using them can travel effortlessly from a flat paved surface onto the rails of the guideway without concern for misalignment. By combining a paved contact surface for wheeled vehicles and rails for steel rimmed vehicles the integrated infrastructure of the present invention blends some of the best attributes of both systems into a seamless and truly integrated bimodal transportation system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is an elevational view of the guideway structure of the present invention.

FIG. 3 is a detailed view of one of the triangle beams taken from FIG. 2

FIG. 4 is a plan view of a surface tread used upon the triangle beam.

FIG. 5 is a side elevational view of the surface tread of FIG. 4

FIG. 6 is an elevational view of the backbone beam used in the system of the present invention.

FIGS. 10-17 are detailed views of various bimodal wheel configurations.

Similar reference characters refer to similar parts throughout the several views of the drawings.

DETAILED DESCRIPTION OF THE PREFERRED EMBODIMENT

Figure 1:
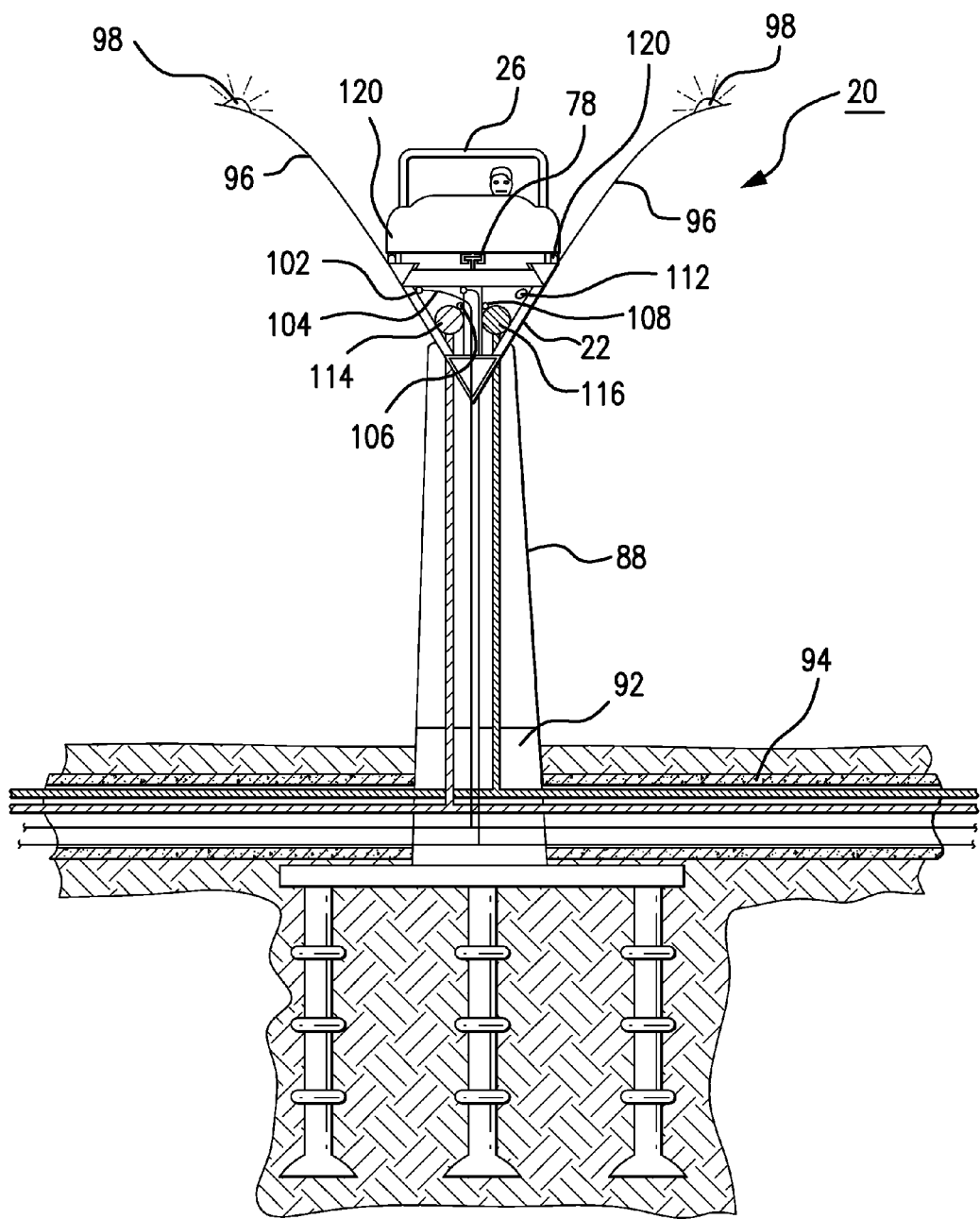
FIG. 1 is an elevational view of the transportation system of the present invention.

The present invention relates to a transportation system 20 that provides a universal infrastructure. In one embodiment, the infrastructure 20 takes the form of a hollow elevated load bearing guideway structure 24 designed to support the weight of traveling vehicles. Structure 24 supports a universal control beam 46 that has multiple functions. These functions may include several forms of vehicle control, security, and energy delivery. Structure 24 supports bimodal wheels 120 (FIG. 9-17). The bimodal wheel 120 has a flat surfaced cylindrical side 134 which functions similar to automotive wheels and steel rimmed surfaces 158, 138, 132, 124 which function similar to the wheels on a train. However, there is not a direct equivalence. A bimodal wheel 120 uses all of these characteristics while traveling on the universal infrastructure. The various components of the present invention, and the manner in which they interrelate, are described in greater detail hereinafter.

Elevated Guideway

FIG. 1 shows the preferred embodiment of the transportation system 20 featuring an elevated guideway 22. FIG. 2 is a detailed end view of the guideway structure 24 upon which the vehicle 26 travels. In a preferred but non-limiting embodiment, guideway structure 24 is in the form of a triangle approximately six feet long on each side. There are three structural triangle shaped beams. These include two upper triangle beams 28 in each corner and a lower triangle beam 30. This configuration maximizes the strength to weight ratio. Each structural triangular beam has a solid triangular stiffener to add further strength. This includes stiffeners 32 for the upper triangle beams 28 and a stiffener 34 for the lower triangle beam 30.

The two upper triangle beams 28 are joined by a cross beam 36. An additional cross beam 38 rests on top of lower triangle beam 30 to distribute the load from tubular struts 42. Tubular struts 42 serve to join triangular beams 28 and 30 and transfer the load on beams 28 to beam 30. Loads on beams 28 are also transferred via tension from tubular strut 44 back up to universal control beam 46. Vertical strut 44 forms part of a truss web for joining universal control beam 46 to cross beam 38. Components 36, 38, 42, and 44 are preferably in a plane. Struts 42 and 44 transfer loads to and from beams 28, 30, 36, 38, 46. Again, center strut 44 transfers a tensile force to the bottom of universal control beam 46.

Figure 7:
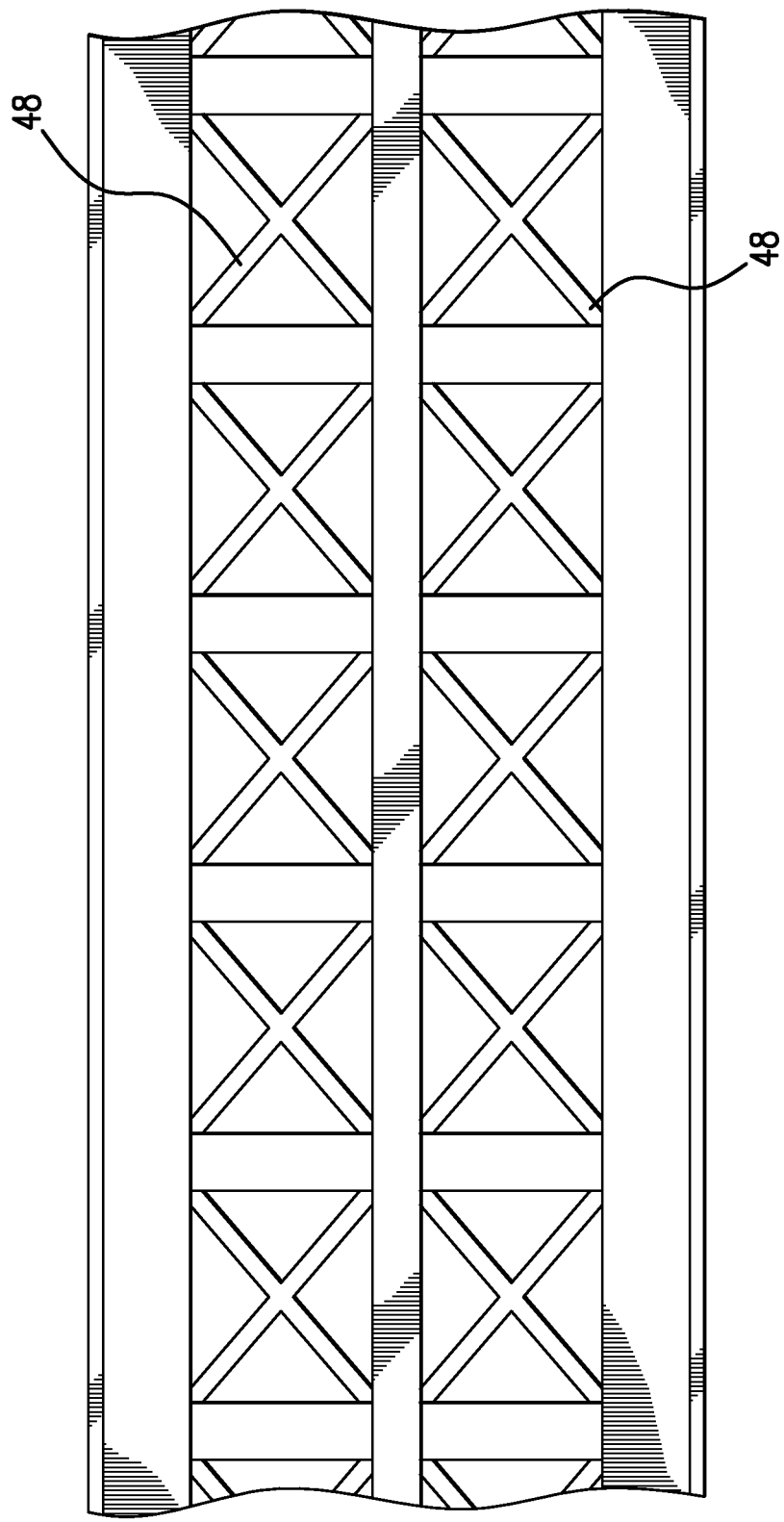
FIG. 7 is a top plan view of the elevated guideway structure.
Figure 8:
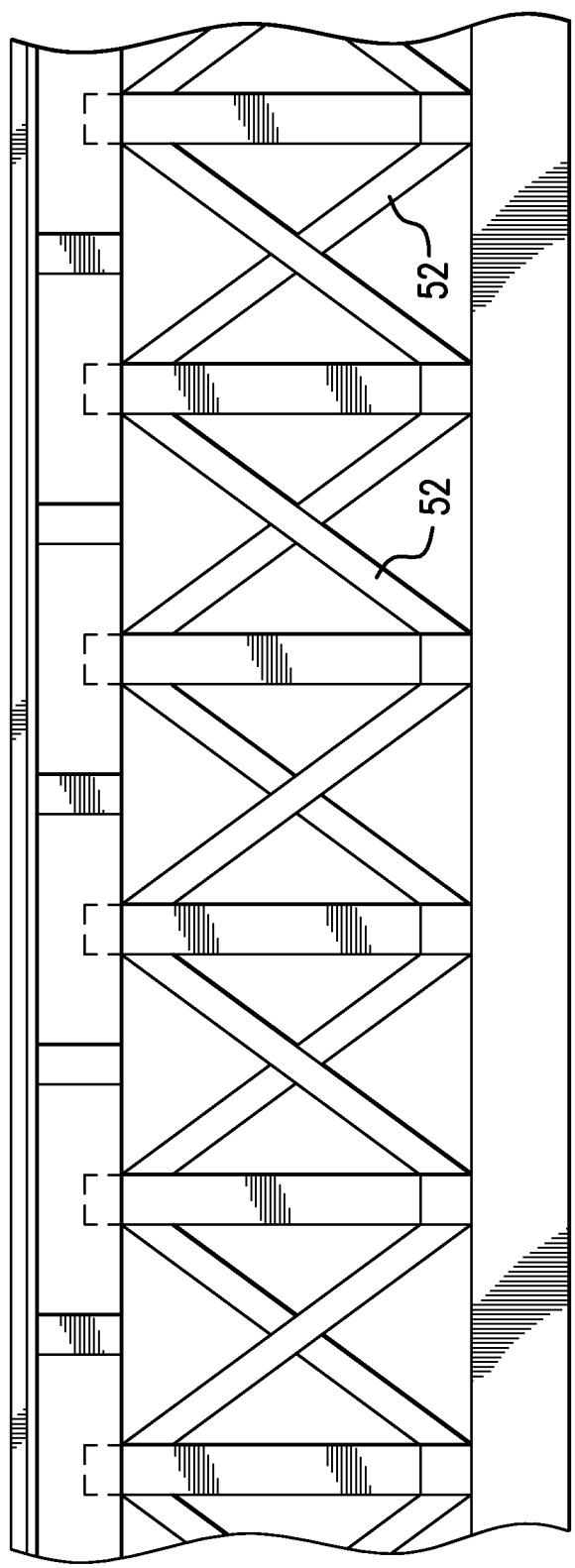
FIG. 8 is a side elevational view of the elevated guideway structure.

As noted in FIGS. 7 and 8, cross bracing stiffeners 48 and 52 are included to prevent racking and twisting of guideway structure 24. A skin sheathing 75 (note FIG. 2) may be added to the sides of the guideway structure 24 to add aesthetics and further strength. It is understood further structural analysis may modify or add additional bracing.

FIG. 3 is a detailed view of one of the upper triangular beams 28 taken from FIG. 2. This view shows details regarding the surface of beam 28. An integral mounting bracket 54 wraps around beam 28 and forms the structural mounting shell for contact surfaces 58, 60, 66, 64. A structural rail 56 with an associated crown rail 72 is also included. Contact surface tread 58 is filled with a high strength epoxy based filler 60.Layers of a unidirectional reinforcing carbon fabric 64 are also included. Fabric 64 is finished with a hard durable wear resistant finish surface 66. Finish surface 66 is the contact surface the vehicle wheels will travel on. When the contact surface is worn and needs replacement or refinishing the contact surface 58 as well as the associated layers (60, 64, and 66) may be removed and shipped back to the factory.

By way of this construction, instead of thousands of tons of petroleum based asphalt to grind up and replace there will be a surface only a few inches wide and about two inches thick. FIGS. 4-5 show how the ends of the contact surface 66 will be finished in order to allow for expansion and to minimize road noise. Looking at the top view there is a small opening 68 cut at a sharp angle. Looking at the side view the thickness of the material is sliced back at an angle so that the vehicle wheels do not cross the expansion joint all at one time. This will prevent the familiar clickety clack of concrete paved roads.

The structural rail 56 is capped with a contact crown rail 72. Vehicles using bimodal wheels with steel drums will ride on and with steel flanges will ride against the contact crown rail 72. Contact crown rail 72 is made to be easily and inexpensively replaceable when contact wear causes damage to its surface. A clamp 74 on the underside of beam 28 slides over a trough on each side of integral mounting bracket 54 to lock bracket 54 in place.

Universal Control Beam

The universal control beam 46 is a component of the guideway 22 and has several purposes. Universal control beam 46 is shown as an I-beam, however, it is understood this universal control beam could have numerous other configurations such as a T, U, C, E, V, W, etc. beam. It may also be rotated in various positions. Any such shapes are acceptable provided they enable the universal control beam to accomplish its purposes. A primary purpose of universal control beam 46 is to serve as a source of reference for vehicle mounted sensors that provide guidance to vehicles 26 upon the guideway 22. Under normal conditions this will reduce flange contact and wear against the crown rail 72 and the steel wheel flange. A suitable sensor arrangement is described in co-pending application Ser. No. 61/221,701 (hereinafter '701 application) filed on Jun. 30, 2009 and entitled "Sensory Stabilizer Saddle." The contents of this co-pending application are fully incorporated herein. Another purpose is to provide secure vehicle stability for occasions when road conditions or weather is hazardous.

Universal control beam 46 also prevents hijacking of vehicle 26 and likewise provides emergency steering control in the event of any sort of disturbance or electronic systems failure. Universal control beam 46 assures all vehicles 26 remain on the guideway 22 at all times. Universal control beam 46 serves as a mechanism for delivering electricity to some or all vehicles on the guideway 22. Furthermore, universal control beam 46 is a vital but passive component in the guideway switching process whereby a vehicle can be switched off of one guideway onto another. This switching process is likewise described in the '701 application.

Universal control beam 46 provides an immovable surface for emergency braking of vehicles 26 and also enables guideway 22 to use the narrow, tire width wide, contact surface treads 58 because it provides precise and predictable tracking of vehicle wheels. As such, universal control beam 46 provides both positive tracking and fail safe control and permits use of the guideway 22 in all weather conditions. The associated traction control ensures that vehicles 26 cannot be blown off or torn apart in a hurricane, tornado, or earthquake. Likewise, vehicles 26 cannot slide off or roll off due to snow, ice, mud, rain, wind, or grease. Fail safe control means positive control in the event electromagnetic wave, electric, smog, fire, smoke, rain, mist or any electric disturbance disrupts wireless communication. The traction control and fail safe aspects of the invention are more fully described in the '701 application.

FIG. 6 illustrates a section of universal control beam 46. In addition to the functions described above, universal control beam 46 is also used in delivering electricity to vehicles 26 riding upon the universal control beam 46. In the preferred embodiment, power is transferred from an electrical supply assembly 76 to a corresponding saddle 78 on the underside of vehicle 26 (note FIG. 1) Saddle 78 and supply assembly 76 close an electrical circuit to power vehicle 26. Electrical supply assembly 76 preferably includes a electromagnetic radiation Shield 82, a dielectic electrical insulator 84 and a conductive electric surface 86. Electric surface 86 provides an electrical conductor to supply electricity to a corresponding electrode in saddle 78. Here the universal control beam 46 provides both support for the conductor assembly and it provides protection of the conducting surface from weather conditions. The electrical supply assembly 82, 84, and 86 may be segmentally continuous along the length of the guideway or it may be a discontinuous segment used for pulse charging as vehicles travel by. Vehicles 26 on the guideway are not required to draw electric from the universal control beam. They may use stored energy such as batteries, fuel cells, capacitors or any suitable source of energy.

Guideway 22 will ideally be able to provide electric power to battery powered, capacitor powered, or any electrically powered vehicle when these vehicles enter onto the guideway 22. The power should be sufficient for vehicles to quickly accelerate up to full speed along guideway 22. In addition, guideway 22 may also supply electric power to standing or parked vehicles so any electric energy storage devices on board the vehicle may be charged.

FIG. 1 shows the guideway structure 24 supported by a hollow structural support column 88. The support column 88 is preferably a hollow reinforced concrete elliptical shaped tower that supports guideway 24 and provides a channel for integrated infrastructure to travel to and from guideway 24. Column 88, in turn, connects to one or more base openings 92, which can be a type of manhole structure that provides a base to support column 88. Base 92 provides access for utility workers to install integrated infrastructure. Bases 92 also interconnect with one or more large diameter underground conduits 94. Conducts Conduits 94 may house sewer mains, water mains, broadband fiber and/or electrical distribution. These lines, in turn, can be connected to the hollow portion of guideway 24 via a base 92 and column 88. These same structural conduits may also be used to deliver electric power from the power grid to the guideway internal power distribution network.

FIG. 1 also illustrates a shield 96 that can be installed on either side of guideway 24. In the preferred embodiment, shield 96 is a non-structural environmental shield (NSES). Such a shield obstructs visual observation of vehicles from the view of observers on the ground. It also diverts the sound of high speed vehicles so they are not heard on the ground. The shield also provides a feeling of security to any passengers on the guideway who are bothered by height. The shield is also used to make the guideway more attractive and protect pedestrians below the guideway from rain. It can be used to support LED area lighting 98 for any roadways or sidewalks below the guideway. Thin film photovoltaic solar energy collectors may be installed on the upper surface of shields 96. These may be particularly beneficial on guideways that travel east to west as they would have sun exposure for longer periods.

FIG. 1 further illustrates some of the utilities infrastructure associated with guideway 24. Integrating utilities infrastructure with guideway 24 would reduce clutter associated with numerous overhead cables. The integrated utilities infrastructure may include high voltage transmission lines. Electrified guideway 24 may also need a high voltage supply direct from the power grid. If guideway 24 provides pulse charging to vehicles 26 it will need may utilize super cooled devices for providing that service. Any high voltage transmission lines may be constructed from using superconductor cables. Super conductor cables are brittle ceramic so they can not be strung on outside power poles. The guideway structure 24 provides a rigid structure that protects the conductors and components from lightning, wind forces, ice loads, and provides easy access. Therefore, guideway 24 can be used for transmitting electric, for local distribution, to provide electric for automotive traffic signals, and LED lighting for the roadway below. All power poles can be eliminated so there is room for the guideway.

Guideway 24 can be installed in high density or otherwise intensely developed metropolitan areas. Using guideway 24 as a conduit for utilities infrastructure would solve problems associated with crowding in such areas. Several possible utilities are shown. Possible lines to be routed through guideway 24 include, inter alia, super cooled high voltage transmission lines 102, lower voltage electric distribution lines 104, fiber optic cables 106, fiber optic cable for proprietary broadband 108, and other miscellaneous communication cables 112. Fresh water and sanitary sewer force mains (114 and 116) can likewise be included. All such lines can be routed from the interior of guideway 24, through column 88, base 92 and conduit 94. This includes every utility a modern civilization requires.

Vehicle and Bimodal Wheels

Figure 13A:
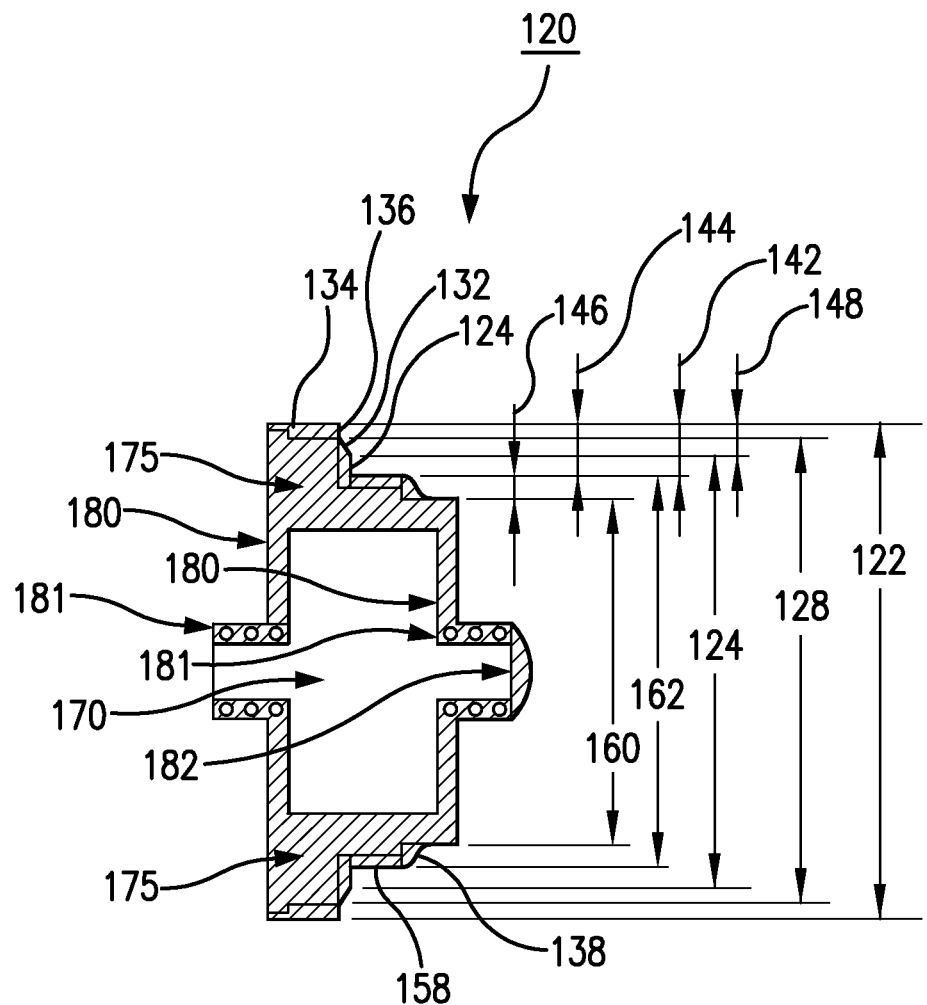

In the preferred embodiment, system 20 utilizes vehicles 26 using bimodal wheels 120. FIGS. 10-17 illustrate a variety of bimodal wheel configurations. However, FIGS. 13 and 13a illustrates the preferred bimodal wheel configuration. Any of the bimodal wheels of FIGS. 10-17 are designed to operate on disclosed guideway structure 24. In each instance, the entire weight of vehicle 26 is supported either by the wheels surfaces 134 (FIG. 13) on the contact surface 66 (FIG. 3) or on the steel wheel contact surface 158 (FIG. 13) on rail 72 (FIG. 3). Additionally, vehicle steering is provided by a sensory steering saddle 78 (FIG. 1) referenced off of the universal control beam 46. Such sensory steering saddles are described in the '701 application. Alternatively, steering can be accomplished by rails 72 on the sides of guideway 24. Vehicles 26 with bimodal wheels 120 can also operate on guideway 24 with the entire weight of vehicle 26 being supported by rails 72. In this case, steering of the vehicle may also be provided by the rails. Vehicle 26 employing bimodal wheels 120 can get off guideway 24 and travel on conventional road surfaces.

In FIG. 14, wheel 120 is similar to a regular vehicle wheel with diameter 122 that travels on the contact surface of the guideway. The side face 136 of the wheel is protected with a steel bumper face rim 124 with outside diameter 126 and inside diameter 162. When the guideway 24 has rails 72 the steel bumper base rim 124 may rub against the steel rails 72. The outside taper diameter 128 of the tapered steel bumper face rim 124 of tapered bumper surface 132 that prevents wheel 120 from climbing onto steel rail 72. The radius of wheel 120 less the outside radius of the steel bumper rim 124 before it tapers must also be less than the height of the lowest rail 72. The taper 132 of steel bumper is the steering edge but the rim 124 is the buffer surface. This is illustrated in FIGS. 16-17, where the steel buffer rim 124 and tapered flange 132 are brushing against the rail 72 in FIG. 17.

FIG. 13 illustrates another embodiment of a bimodal wheel 120. FIG. 13 shows a cross-section view through the center of the bimodal wheel in FIG. 13. It has a regular traction wheel surface 134 that operates on a flat contact roadway surface. It also includes replaceable steel wheel rim 158 that rides on the top of the contact rail 72. A tapered wear surface 132 separates the elastic contact surface 134 from the steel surface 158. Wheel rim 124 rubs up against the side of the contact rail 72 and provides directional control to vehicle 26 and also protects the contact surface 134. A replaceable self mounting rail flange 138 is also included to enable a vehicle 26 with bimodal wheels 120 to come off of a conventional flat surface roadway and drive onto an access ramp and allow vehicle 26 to seamlessly drive right up on rail 72.

In FIGS. 12 and 13 the distance 142 is the difference in the radius between the contact surface 134 and the steel surface 158. This distance 142 is less than the height of a standard rail but greater than the height of a short rail or a standard rail when a contact surface reduces the standard rail height. The distance 144 is the difference in the radius between the contact surface 134 and the leading edge diameter of the self mounting steel flange 138. This distance 144 is greater than the height of a standard rail. The distance 146 is the difference between 144 minus 142. The standard rail height must be within this incremental gap. This differential enables bimodal wheel 120 to automatically ride up on the standard rail 72. The height of the standard rail must be greater than 142 and less than 144. A short rail must be less than 142 but greater than 148. In the cut away view of FIG. 13A, element 175 is the structural frame of the bimodal wheel and may also become a part of the stator when there is an in-wheel motor. The hollow core 170 of the structural frame may contain the rotor component of an in-wheel motor firmly fixed to a non-rotating axle. The frame (stator) 175 is attached by structural flange 180 to bearings 181 which allow the bimodal wheel to rotate about the a fixed axle. The inside space 170 is sealed off from outside elements by the solid surface flanges 180 and a rotating bearing hub 182 is attached to bearing 181.

This self mounting aspect of the bimodal wheel 120 is illustrated in FIGS. 16 and 17. In FIG. 16, the self mounting contact flange 138 is seen approaching above the standard rail 72. As the bimodal wheel moves closer to the rail the self mounting contact flange 138 will come into contact with the steel rail 72 and contact surface 158 will slide onto the rail as shown in FIG. 17. In FIG. 17, the height of rail 72 is greater than the distance between the outside radius of contact surface 134 and the outside radius of steel surface 158, so the bimodal wheel is lifted up in the air by a distance of the rail height minus distance 142.

FIG. 12 illustrates another embodiment of the bimodal wheel 120. In this embodiment, the steel wheel rim 124 is replaced by a concave groove 148. Other groove arrangements, such as a v-groove, or other shaped grove, can also be employed. As illustrated, groove 148 fits onto rail 62. In this regard, the top of rail 62 can be made to specifically fit into groove 148. Furthermore, the steel wheel rim 124 should be at both the front or and back surface of wheel 120.

As shown in FIG. 12, the bimodal wheel 120 can have an additional traction wheel as an all terrain or all purpose off road wheel 152 with a diameter 154 larger than the diameter 122 of the regular contact wear surface wheel 134. When vehicle 26 is on guideway 24, if the depth of the rim 156 is less than the height of the rail 62 then the vehicle weight will be riding on the rail 62 and will be steered by the rails 62. If the depth of the rim 156 is greater than the height of the rail 62 then the weight of the vehicle will be supported by the wheel 134 on the contact surface 56 and the vehicle will be steered by the rail 62. When the vehicle leaves the guideway 24 the weight of the vehicle 26 will be on the all-purpose tire 152 and the vehicle will be steered manually. This protects the contact wear surface 134 from all the pavement hazards that a wheel surface such as 152 is exposed to on a typical paved roadway. This embodiment illustrates the flexibility of the bimodal wheel. A vehicle equipped with bimodal wheels can not only operate on rails, on the guideway contact surfaces, or paved asphalt roads, but it can also be an all-terrain vehicle that can travel on dirt, gravel, grass, sand, muddy mountain trails, or on a beach.

Another advantage to bimodal wheels 120 is realized when using them on especially large or heavy vehicles. When conventional trains operate in areas where the railroad bed has to climb steep grades they have a traction problem. Steel wheels on steel rails have little traction. In order to improve traction they carry sand and the sand is applied in front of the wheels as they climb steep grades. In addition they may have additional locomotives on that section of a rail road to help pull the load up a grade. Even then trains are limited to mild uphill grades compared to automotive vehicles.

With the disclosed guideway 24, heavy vehicles may operate on steel rails 72. However, when vehicle 26 climbs steep grades, or descends even steeper grades, rails 72 may be made shorter, less than distance 142, such that the weight of the vehicle is supported on the contact surface 134 of the bimodal wheels and contact surface 66 of the guideway. Or alternatively, the rails may remain the same height, but the paved contact surface will raise up to lift vehicle weight off of the rails. The C contact surface 66 may be modified into a surface material that can provide greater traction to the contact surface 134 than the vehicles would otherwise have on rails 72 or on ordinary pavements. This gives vehicle 26 greater traction using its contact surface 134 rather than steel surface 158. To provide greater traction for large tandem wheeled freight vehicles the contact or traction surface tracks may be doubled for ascending and descending grades. In such embodiments, vehicle 26 may still be steered by rails 72, but the vehicle weight is supported on contact surfaces 66. The ability to climb and descend even steeper grades is important. It means that routes through mountains can be selected that will be much shorter. It also means that on a per foot or per mile basis, the cost of constructing the roadway will be reduced substantially. In the long run the shorter roadway through mountains means large numbers of vehicles will get through faster and will expend less energy. So, this becomes a continuous operating benefit and savings.

Figure 10:
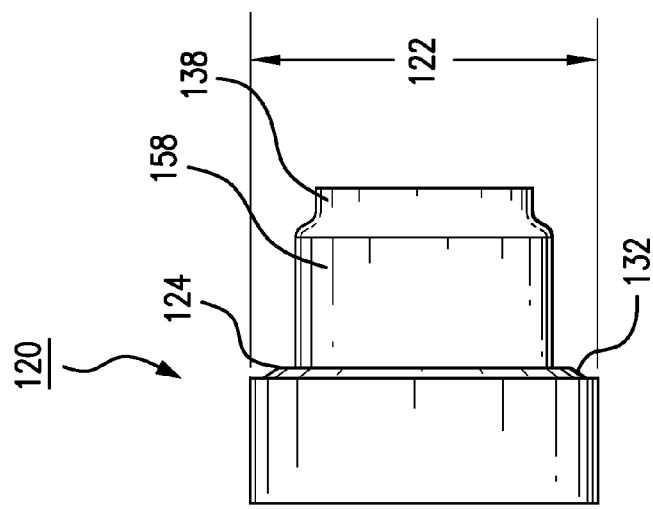
Figure 9:
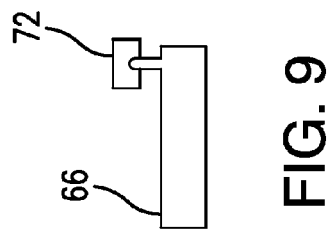
FIG. 9 is a detailed view of the railway contact surface.

FIG. 10 illustrates a modified bimodal wheel 120 that would be located on a bogie or undercarriage located somewhere midway on long vehicles 26 to address issues related to lateral shifting. When a long vehicle travels around a curve and if there are wheels located between the leading and trailing wheels the curvature of the track will shift along the face 158 of the steel surface. To counteract this, steel wheel contact surface 158 is made several times wider than the steel rail so as the rail 72 shifts sideways the rail is still under the tire steel surface 158. This modification works within limits on curves that are not real extremely sharp.

Figure 11:
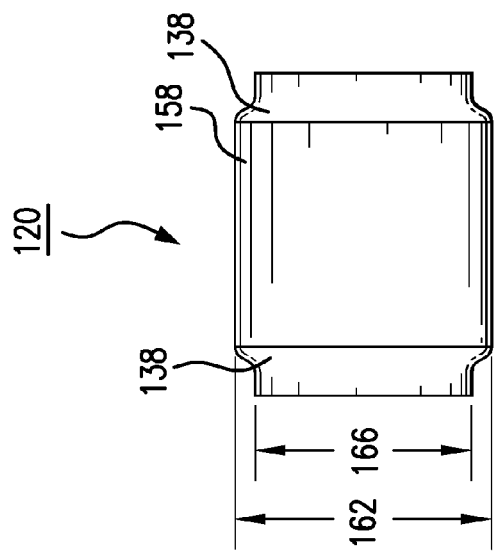

FIG. 11 is another embodiment in the bimodal wheel system 120 that addresses issues related to track shifting along extreme curves. The steel surface 158 now constitutes the entire wheel 120, and the diameter 162 of the wheel 120 is the diameter of the steel contact surface 158. It has self mounting wheel flanges 138 with a minimum diameter 166. Steel wheel 158 allows tires 120 on the mid length located carriages to follow the contact surface even as the tires 120 are otherwise shifting with the rail. These intermediate wheels provide support and traction to push the vehicle forward (and can provide regenerative braking) and they support their share of the load, but they do not provide steering. Instead, steering is accomplished via the wheels of the front and back undercarriages or bogies or preferably by the sensory saddle navigation off of the universal control beam. If the rails are turning so sharply that the wheels in FIGS. 10-11 are not wide enough the wheels may lose contact with the rails and may be supporting no load and providing no traction. This will shift the entire load and traction to the wheels that are in contact with contact surface 66 or rails 72. The self mounting wheel 138 of the wheels will bring them back on the tracks when they come back into closer alignment.

The bimodal wheels in FIGS. 10 and 11 are wider and therefore may support a different kind of in wheel motor compared to the wheels in FIG. 13, 16, or 17. These wheels may house motors with greater torque but perhaps lesser efficiency. These motors may operate when the vehicle is accelerating and so needs lots of torque, or when it is braking and needs lots of regenerative braking. When the vehicle is operating on a relatively flat surface at a constant speed these mid vehicle in wheel motors may shut off and the vehicle would use only the more efficient in wheel motors in the front and rear carriages. Then all these bearing wheels would be doing is helping to carry the load.

Access Ramp

Figure 18:
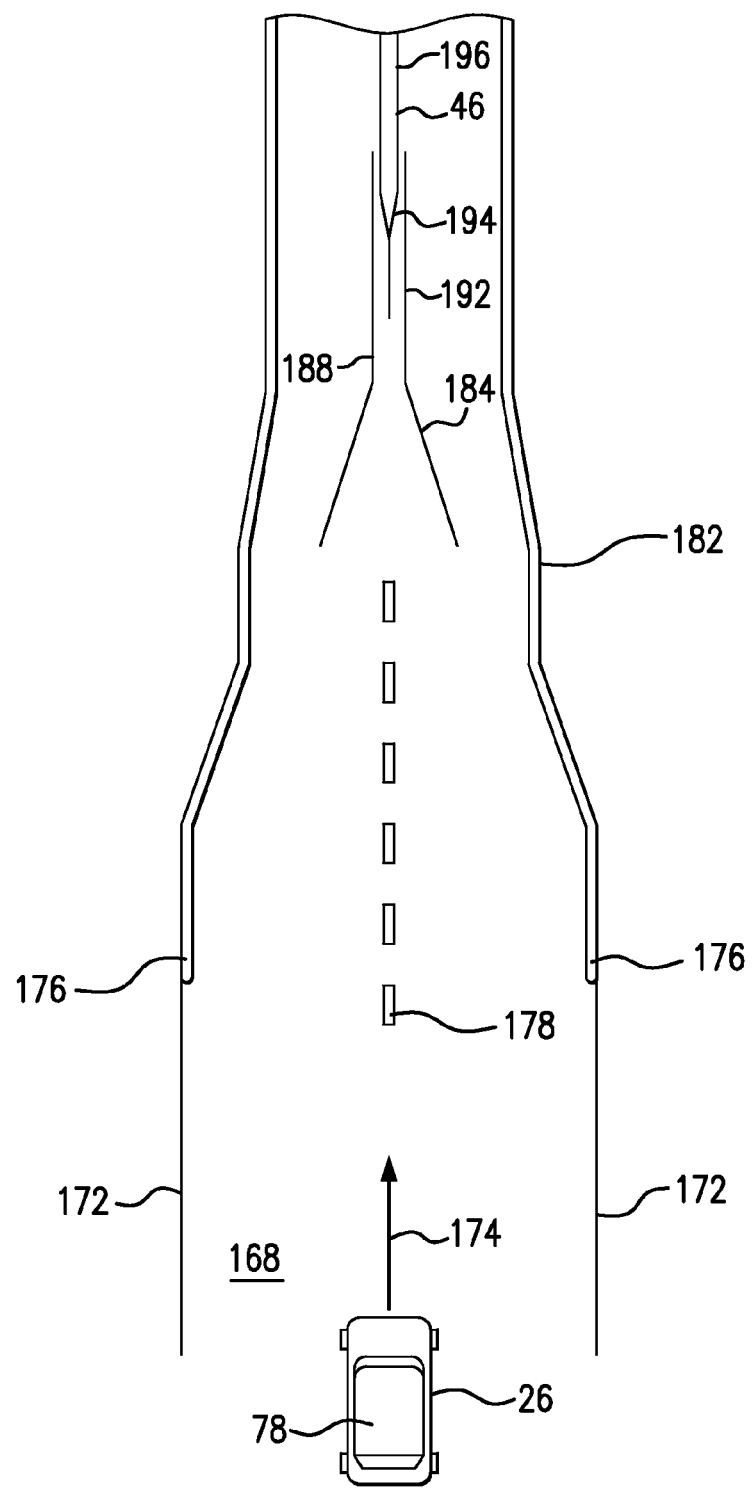
FIG. 18 is a view of an on-ramp to the transportation system of the present invention.

FIG. 18 shows a top view of a generalized guideway infrastructure access ramp. The access ramp is for vehicles with or without any of the bimodal wheels discussed above used on bimodal vehicles of any kind described herein. The vehicles could be using ordinary wheels without steel flange wheels. The flat paved access ramp begins at 168 with edges of pavement 172. As vehicle 26 moves forward in direction 174 it is under manual control. The driver of vehicle 26 must maneuver the vehicle onto the guideway. The guideway ramp makes this process simple. The side rails 176 are either short rails or contact surface is raised. The driver is to line the vehicle up with the center stripe 178; however, if the vehicle meets the short rails, the vehicle will be funneled in until at location 182 the sensory saddle shoe 78 that all of the vehicles must have underneath the center of the vehicle enters the chute 184. The dimensions of 182 and 184 and vehicle 26 are such that the saddle 78 can only go into chute 184. At location 188 the saddle chute 184 is only a couple inches wider than the saddle 78 and saddle 78 is guided onto the vertical universal control beam 46 at 192 that flares out at position 194. Immediately when the sensory saddle contacts the universal control beam 46 the vehicle receives a great amount of electric energy that begins an enormous acceleration. If the vehicle is bimodal for rails then wheels on both sides of the vehicles will be on the rails at location 188 however, these are short rails 176. The rails are not supporting the vehicle weight, but they are steering the vehicle. At location 196 after the vehicle has accelerated to full speed using the greater rubber tire traction the short rails become the taller standard rails 72 (i.e. the contact surface moved lower) which then support the weight of the vehicle. This completes the description of how vehicles use the passive access ramp to get onto the integrated multimodal guideway. Vehicles without bimodal wheels would continue on the contact surface and would be steered by the sensory saddle.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A universal surface transportation system comprising:
   a hollow guideway having a triangular cross section with a horizontally oriented cross beam, a vertically oriented center strut, and a pair of angled side struts, the guideway being defined by two upper corners and a lower corner, a control beam centrally located on the cross beam;
   a pair of upper triangular-shaped tubular members positioned within the two upper corners of the hollow guideway, each of the upper triangular-shaped tubular members including an outside edge, a lower triangular-shaped tubular member positioned within the lower corner of the guideway;
   a rail positioned at the outside edge of each of the upper tubular members, a contact surface formed adjacent each of the rails, the rail and adjacent contact surface adapted to be engaged by a bi-modal wheel;
   a series of structural columns for supporting the hollow guideway at a distance above the ground;
   whereby loads applied to the rails and contact surfaces are transferred to the control beam via compressive and tensile loads in the side struts, lower tubular member, and center strut.

2. A universal surface transportation system comprising:
   a hollow guideway having a triangular cross section, the guideway being defined by two upper corners and a lower corner;
   a pair of upper triangular-shaped tubular members positioned within the two upper corners of the hollow guideway, each of the upper triangular-shaped tubular members including an outside edge, a lower triangular-shaped tubular member positioned within the lower corner of the guideway;

whereby loads applied to the outside edges of the upper tubular members are transferred to the lower tubular member.

3. The transportation system as described in claim 2 wherein the hollow guideway is formed from a horizontally oriented cross beam, a vertically oriented center strut, and a pair of angled side struts.

4. The transportation system as described in claim 2 wherein a rail is positioned at the outside edge of each of the upper tubular members, and a contact surface formed adjacent each of the rails, the rail and adjacent contact surface adapted to be engaged by a bi-modal wheel.

5. The transportation system as described in claim 2 wherein a series of structural columns are included for supporting the hollow guideway at a distance above the ground.

6. The transportation system as described in claim 3 wherein a control beam is centrally located upon the cross beam.

7. The transportation system as described in claim 6 wherein loads applied to the outside edges of the upper tubular members are transferred to the control beam via compressive and tensile loads in the side struts, lower tubular member, and center strut.

8. The universal surface transportation system of claim 6 wherein the control beam is used as a steering reference for the vehicle located thereon.

9. The universal surface transportation system of claim 6 wherein the control beam provides a switching reference for the vehicle located thereon for controlling switching from guideway to guideway or switching from guideway to or from the on and off access ramps.

10. The universal surface transportation system of claim 6 wherein the control beam is used to further guide the vehicle into the system while being funneled into the system on the access ramp.

11. The universal surface transportation system of claim 6 wherein the control beam is a conduit for the utilities infrastructure located in the central column such that the vehicle located in the system can access the utilities infrastructure.

12. The universal surface transportation system of claim 6 wherein the control beam is used to secure the vehicle to the guideway so vehicles remain on the guideway at all times.

13. The universal surface transportation system of claim 6 wherein the control beam provides secure communications contact interface and traction control with vehicle systems.

14. The universal surface transportation system of claim 6 wherein the control beam provides vehicle stability when road conditions are hazardous.

15. The universal surface transportation system of claim 6 wherein the control beam prevents hijacking of vehicles.

16. The universal surface transportation system of claim 6 wherein the control beam provides emergency steering control in event of catastrophic systems failures.

17. The universal surface transportation system of claim 6 wherein the control beam enables precise, predictable vehicle tracking and operation in all weather conditions.

* * * * *